United States Patent [19]

Gibson

[11] 4,394,303

[45] Jul. 19, 1983

[54] LARGE PORE SHAPED HYDROPROCESSING CATALYSTS

[75] Inventor: Kirk R. Gibson, El Cerrito, Calif.

[73] Assignee: Chevron Research Company, San Francisco, Calif.

[21] Appl. No.: 262,856

[22] Filed: May 12, 1981

[51] Int. Cl.$^3$ .......................... B01J 23/84; B01J 35/02
[52] U.S. Cl. .................................... 252/470; 252/467; 252/477 R; 208/216 PP
[58] Field of Search .................. 252/477 R, 467, 470; 208/216 PP

[56] References Cited

U.S. PATENT DOCUMENTS

| | | | |
|---|---|---|---|
| 2,408,164 | 9/1946 | Foster | 252/477 R |
| 3,764,565 | 10/1973 | Jacobs et al. | 252/477 R |
| 3,966,644 | 6/1976 | Gustafson | 252/477 R |
| 4,133,777 | 1/1979 | Frayer et al. | 252/477 R |

*Primary Examiner*—W. J. Shine
*Attorney, Agent, or Firm*—D. A. Newell; S. R. LaPaglia; C. L. Hartman

[57] ABSTRACT

Catalyst shapes for inorganic oxide, hydroprocessing catalysts are disclosed. When the catalyst is used for diffusion limited reactions, and particularly when it is used for demetalation, shaped catalysts give longer catalyst lifetimes. Preferred shapes include fluted trilobal, asymmetric quadralobal and elongated quadralobal.

4 Claims, 3 Drawing Figures

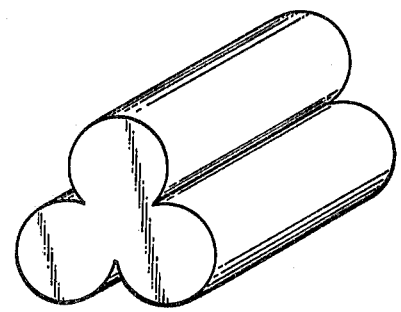
FIG._1.
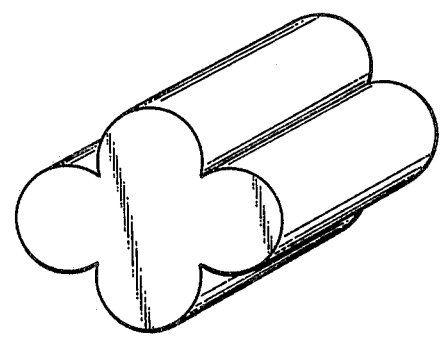
FIG._2.
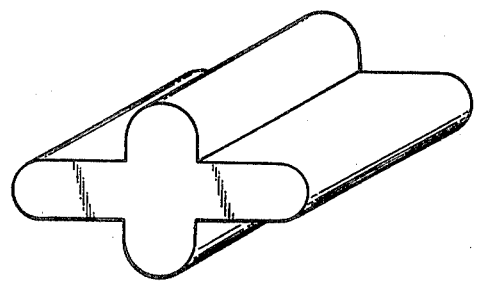
FIG._3.

LARGE PORE SHAPED HYDROPROCESSING CATALYSTS

BACKGROUND OF THE INVENTION

This invention relates to catalytic compositions and their use for the hydroprocessing, e.g. hydrodesulfurization and hydrodemetalation of feedstocks containing sulfur and metals. In particular, this invention concerns shaped extruded catalysts that are polylobal in cross-section.

A number of catalyst shapes have been described in the prior art. U.S. Pat. No. 2,408,164 to Foster discloses catalyst shapes including solid and hollow cylinders, elongated star shapes, cylinders with corrugated edges, etc. Similar shapes are also shown in U.S. Pat. No. 3,997,426 to Montagna et al. U.S. Pat. No. 3,966,644 and U.S. Pat. No. Re. 30,155, issued to Gustafson disclose trilobal catalysts for hydrocarbon conversion. U.S. Pat. Nos. 3,674,680 and 3,764,565 to Hoekstra and Jacobs disclose catalyst shapes designed to eliminate catalytic material more than 0.015 inch from the catalyst surface. U.S. Pat. No. 3,347,798 to Baer et al discloses the production of hollow bead catalysts. U.S. Pat. No. 3,957,627 discloses spherical catalysts having a void center and a hole extending to the external surface. U.S. Pat. Nos. 4,116,819 and 4,133,777 disclose catalysts in the shape of elongated extrudates having alternating longitudinal grooves and protrusions on the surface.

The purpose of shaped catalysts has been to increase surface to volume ratio over conventional shapes, such as round cylinders and spheres. Surface to volume ratios can be increased by reducing the size of the particles, but beds of such particles tend to have unacceptably high pressure drops across the bed.

SUMMARY OF THE INVENTION

The present invention provides catalyst particles suitable for use in hydroprocessing heavy oils, particularly hydrodesulfurization and hydrodemetalation reactions. The particles are characterized by a refractory inorganic oxide support having a mean pore diameter in the range of 120 Angstroms to 700 Angstroms, more preferably 120 Angstroms to 200 Angstroms with metals of Group VIB of the periodic table, preferably molybdenum or tungsten, present in the range of between 2 and 15 weight percent, preferably 5 to 12 weight percent when weight percent is based on the metals content of the catalyst particle measured as reduced metal, and metals of Group VIII of the periodic table in the range of between 0 and 10 weight percent, preferably 2 and 4 weight percent, when weight percent is based on the metals content of the catalyst particle measured as reduced metal, which is extruded into polylobal cross-section such that substantially all regions of said particle are within 0.02 inch from the surface of the particle, more preferably within 0.015 inch. Preferred shapes include trilobal, asymmetric quadralobal and elongated quadralobal shapes. The size, shape and porosity of the particles of this invention are selected that under hydroprocessing conditions substantial penetration of nickel or vanadium will be observed at 0.012 inch from the surface of the catalyst, preferably 0.015 inch.

DESCRIPTION OF THE DRAWINGS

FIG. 1 shows a view of a trilobal particle.

FIG. 2 shows a view of an asymmetric quadralobal particle.

FIG. 3 shows a view of an asymmetrical elongated quadralobal particle.

DETAILED DESCRIPTION

Feedstocks

Due to shrinking world supply of crude oil, oil processers and refiners must use crudes that are highly contaminated with metals, particularly iron, nickel, and vanadium, and have high concentrations of nitrogen and sulfur. Valuable light products can be made with heavy metal containing feedstocks, for example, crude oil, topped crudes, atmospheric and vacuum residua, and various synthetic oils, for example, liquefied coal, and oil from oil shale, if the contaminating metals can be removed. Typical feedstocks that can be improved by use of the shaped catalyst of this invention include those with as high as 10 weight percent or more asphaltene content, where asphaltene is defined as that portion of the feedstock not soluble in n-heptane. Asphaltenes include as a major constituent large molecules that bind metals, for example, porphorins. The feedstocks of this invention will be characterized by containing at least 10 ppm nickel plus vanadium.

Catalyst Bases

Any catalyst base with a minimum mean pore diameter of about 120 Angstroms, as well as those with much larger pore diameters can be used for the catalyst particles of this invention.

Mean pore diameter can be calculated by the following formula:

$$\text{Mean Pore Diameter} = \frac{4 \times PV \times 10^4}{SA},$$

where PV is pore volume, and SA is surface area, as determined by nitrogen adsorption. The mean pore diameter is expressed in Angstroms, pore volume in cc/grams and surface area in m$^2$/g. Typical catalyst bases include those made of alumina or silica, or both, as well as other refractory inorganic oxides, for example, boria, magnesia, titania and the like. The catalyst support of the present invention can be manufactured by any conventional techniques. Catalyst bases can be all or part fibrous clays, for example sepiolite, attapulgite or halloysite.

The base may contain catalytic metals, in particular metals from Group VIB of the periodic table, especially molybdenum and tungsten and from Group VIII of the periodic table, especially nickel and cobalt. Catalytic metals may be placed in the support by conventional techniques, such as, comulling, impregnation and the like. Levels of metal useful for this invention are between 2 and 15 weight percent and preferably between 5 and 12 weight percent Group VIB metal when weight percent is measured as weight of reduced metal as a percentage of total particle weight, and between 0 and 10 weight percent and preferably between 2 and 4 weight percent of Group VIII metal when weight percent is measured as weight of reduced metal as a percentage of total particle weight. Preferred Group VIB metals include molybdenum and tungsten, and preferred Group VIII metals include nickel and cobalt.

Shaped Catalyst Particles

One method to increase surface to volume ratio is to shape an extruded particle in shapes with other than solid circular cross-section. A variety of shapes are possible, including particles with channels, with holes in them, having star shapes and the like. Although the teachings of this invention apply to any catalyst having a polylobal cross-section, it has been found that preferred shapes are dictated by two practical considerations. The first consideration is the manufacturing ease for making the die plate for the extruder. This dictates that the shape chosen not have small acute angular elements. Since most die plates are made by drilling holes through a plate of metal that is relatively thick compared to the diameter of the holes, a preferential shape is one that is composed of overlapping circular segments of the same or different radii, defined herein as a polylobal shape.

The second consideration is that the shape chosen and the surface to volume ratio of the particles extruded change within acceptable limits as the die plate wears during extrusion. Excessive wear, due to corrosion caused by high pH of the oxide gel extrudate, has been found to be a problem with conventional die plates which are typically made from carbon steel. Alternative materials exist that may provide solutions to this problem, for example tungsten carbide dies, but corrosion will always be a factor in choosing a shape for extrusion of porous catalytic material.

FIG. 1 shows an elongate extruded catalyst particle with a polylobal shape that has been found to be satisfactory for hydroprocessing catalysts. It is a trilobal shape comprised of three substantially tangential circles in cross-section. As the die wears, the angles of intersection of the die tend to become less acute. In the catalyst particles of the present invention all regions of the particle are within 0.02 inch of the particle surface, therefore the radii of the component circles are 0.02 inch or less.

FIG. 2 shows a view of an elongate extruded catalyst particle in another shape that has been found to be a satisfactory shape for hydroprocessing catalysts. It is an asymmetric quadralobe, asymmetric since the centers of the four component circles define two substantially equilateral triangles joined on a base. The radii of the four component circles can be any value to provide a particle with all regions of the particle within 0.02 inch of the surface of the particle.

FIG. 3 shows a view of an elongate extruded catalyst particle in another shape that has been found to be satisfactory for hydroprocessing catalysts. It is an elongated quadralobe. The exact dimensions of the particle are not critical as long as all of the regions of the particle are within 0.02 inch of the surface of the particle. Preferred dimensions include arms that are about 0.010 to 0.025 inch thick with rounded ends and about 0.10 to 0.050 inch at the widest cross-section.

The shape chosen for any application depends on a variety of factors, one being particle crush strength. Quadralobal shapes are expected to be stronger than trilobal shapes.

Metals Penetration

Catalyst particles of this invention are characterized by substantial metals penetration during hydroprocessing service to at least 0.012 inch from the nearest particle surface. Substantial metals penetration is herein defined as penetration of nickel or vanadium to that distance where the local concentration of metal, expressed as a percentage of maximum concentration of the metal within the particle, is at least 2% for nickel and vanadium.

It has been observed that nickel-containing compounds tend to penetrate demetalation catalysts more easily than vanadium compounds, therefore, when the vanadium concentration at a depth of 0.012 inch is at least 2% of the maximum vanadium concentration within the particle, the nickel concentration at a depth of 0.012 inch will be about 10% or more of the maximum nickel concentration of the particle.

Metals concentration within the particle can be analyzed by electron microprobes. The electrons from the probe excite metals on prepared cross-sections of used catalyst particles sufficiently that they emit characteristic X-rays, which can be compared to samples of standard metal concentration allowing concentrations of particular metals to be determined for different distances from the surface of the particle.

If the entire volume of demetalation catalyst is effectively used for demetalation, reactors charged with such catalyst need not be recharged as frequently. Since hydrodemetalation is believed to be diffusion limited, other factors than shape may be optimized to create a superior demetalation catalyst. These include overall particle diameter, internal surface area and pore diameter, intrinsic activity and reaction conditions especially temperature.

By increasing surface-to-volume ratio by shaping catalyst particles, the distance an asphaltene molecule has to diffuse into the particle to reach the particle's center is reduced, and more of the catalyst volume can be used for demetalation. The catalysts used for demetalation are sensitive to the intrinsic activity of the catalyst particle. Lower instinsic activity allows metals to diffuse farther into the particle before reacting. Therefore, more of the particle can have a longer effective life and pore mouths on the surface of the catalyst will not foul as rapidly due to premature metal deposition.

Tables 1 and 2 show metals penetration for catalysts of different porosity. Cylindrically shaped catalysts were chosen since it is easier to measure metals concentrations at fractional radii for cylinders than for polylobal shapes.

TABLE I

Metals Penetration in Arabian Heavy
Atmospheric Residuum Hydroprocessing
Over .031 in. Radius (1/16" diameter) Cylinder
With Mean Pore Diameter of Approximately 140 Angstroms

| | Local Metal Concentration Maximum Metal Concentration | |
|---|---|---|
| Location | Nickel[1] | Vanadium |
| .0085 in. From Edge | .24 | .09 |
| 0.015 in. From Edge | .12 | .02 |
| 0.031 in. From Edge (center) | .08 | .01 |

[1]Maximum Nickel Concentration was at .0019 in. from edge

Table 1 shows the metals penetration for nickel and vanadium for a cylindrically extruded alumina catalyst with a mean pore diameter of about 140 Angstroms. There is substantial metals penetration as deep as 0.015 inch from the edge for both nickel and vanadium, and metals penetrate all the way to the center of the particle.

TABLE 2

Metals Penetration in Arabian Heavy Atmospheric Residuum Hydroprocessing Over Bimodal Pore .032 in. Radius (1/16" diameter) Cylinder With Average Pore Diameter of About 170 And About 19% Pore Volume in 1000 Angstroms+ Pores

| Location | Local Metal Concentration[1] Maximum Metal Concentration | |
|---|---|---|
|  | Nickel | Vanadium |
| .0085 in. From Edge | .56–.84 | .42–.48 |
| .015 in. From Edge | .48–.80 | .29–.31 |

[1]Ranges indicate samples taken from top, middle, and bottom of bed. For nickel, the high end of range (most penetration) occurred at the top of the bed and low end of range occurred at the bottom of the bed.

Table 2 shows metals penetration in cylindrically extruded catalysts having a bimodal pore distribution with an average pore diameter of about 170 Angstroms and about 19% of the pore volume contained in pores with a diameter greater than 1000 Angstroms. Contrasted to the catalyst of Table 1, which has less than 1% of its pore volume contained in pore with a diameter greater than 1000 Angstroms, the metals penetrate much further. In a fluted trilobal shape with component circles of 0.032 inch the metals would penetrate easily to the center, which would be about 0.015 inch from the nearest surface.

Although the catalyst of Table 2 allows more metals penetration, the catalyst of Table 1 shows substantial metals penetration. Extruding either catalyst in polylobal shapes will provide more efficient use of internal catalyst volume.

Preparation

A catalyst, hereinafter Catalyst A, useful in the present invention, is prepared according to the procedure described in U.S. Pat. No. 4,113,661 issued to P. W. Tamm, Sept. 12, 1978, entitled, "Method for Preparing a Hydrodesulfurization Catalyst". An 80/20 by weight mixture of Catapal, made by Conoco, alumina and Kaiser alumina are sized in the range below about 150 microns and treated by thoroughly admixing the mixed powders with an aqueous solution of nitric acid, where for each formula weight of the alumina ($Al_2O_3$) about 0.1 equivalent of acid is used. The treated alumina powder is in the form of a workable paste. A sample of this paste completely disperses when one part is slurried in four parts by weight of water. The pH of the slurry is in the range of about 3.8 to about 4.2, usually about 4.0. After aqueous acid treatment of the powders, aqueous ammonium hydroxide is thoroughly admixed into the paste in an amount equivalent to about 80% of the ammonium hydroxide theoretically required to completely neutralize the nitric acid; that is, about 0.08 equivalent of the hydroxide is added to the paste per formula weight of the alumina present. The ammonium hydroxide used is desirably about an 11% by weight solution because the volatile material evolved during drying and calcination content of the treated and neutralized solids should be in the range of 50-70 weight percent. With the addition and thorough admixing of ammonium hydroxide, the paste changes to a free-flowing particulate solid suitable as a feed to an extruder. The extruder has a die plate that will extrude the shaped particles of the present invention. The extrudate precursor is freed of loosely-held water by an initial moderate drying step, for example, at a temperature in the range of 150° F.–500° F. The preparation of the carrier is then completed by calcining the dried extrudate at a temperature between 500° F.–1700° F. in a dry or humid atmosphere. The resulting carrier has a pore volume of about 0.7 cc per gram, of which at least about 85% is furnished by pores having a diameter in the range between about 80 and 150 Angstroms. Less than about 1.0% of pore volume is furnished by pores larger than 1000 Angstroms. By calcining the catalyst in a 100% steam atmosphere at 900°–1200° F. larger pores for example 160 Angstroms to 190 Angstroms, may be obtained.

Another catalyst, hereinafter Catalyst B, useful in the present invention is prepared as follows.

Eight milliliters of 88% formic acid (specific gravity 1.2) was added to 300 milliliters of distilled water. This solution was added to 500 grams of Kaiser alumina at about 50° C. and about 50 milliliters every minute while mixing. The mixing continued for 20 minutes after all the solution had been added. A second solution made from 6 milliliters of 58% ammonium hydroxide, 45 milliliters of a molybdenum solution, and 200 milliliters of distilled water was added at a rate of 50 milliliters per minute while stirring. The molybdenum solution was prepared by dissolving 17.4 grams of $MoO_3$ in 17.2 milliliters of 30% $NH_4OH$ and 26 milliliters of distilled water. The temperature during the second addition was approximately 60° to 65° C. The doughy mixture was extruded with a trilobal fluted die and dried on a screen tray in a preheated oven at 120° C. for 2 hours and then at 200° C. for 2 hours. The dried extrudate was calcined at 680° C. in a steam atmosphere. After one hour, fresh dry air replaced the steam and the extrudate was calcined for another half an hour at 680° C.

Uses

The shaped catalyst particles of the present invention can be used for hydroprocessing hydrocarbonaceous feedstocks, particularly hydrodesulfurization and hydrodemetalation. The generic hydrogen treating conditions include reactions in temperature range of about 200°–540° C., a total pressure in the range of from about 1 atmosphere to about 300 atmospheres with hydrogen partial pressure up to about 200 atmospheres, a hydrogen to oil feed ratio up to about 9,000 standard cubic liters per liter of oil, and a liquid hourly space velocity (LHSV) of about 0.02 to about 25 reciprocal hours.

It has been found that many times a good catalyst for demetalation is not equally good for desulfurization. The reverse is also frequently true. Two beds of shaped catalyst have been found to remove metals and sulfur better than a bed of one catalyst alone. In particular a first bed is charged with catalyst with pores of 150 Angstroms to 200 Angstroms average calculated diameter and the metals loading of 0 to 2 weight percent cobalt and 2 to 8 weight percent molybdenum and a second bed is such as catalyst B charged with catalyst with pores of average calculated pore diameter of 120 Angstroms to 150 Angstroms and metals loading of 2 to 4 weight percent CO and 5 to 12 weight percent molybdenum, such as Catalyst A. Either bed of catalyst or both beds of catalyst may be shaped. The beds of shaped catalyst have lower pressure drops than could be obtainable by a bed of smaller particles that has the same external particle area.

What is claimed is:

1. A catalyst for hydroprocessing heavy hydrocarbonaceous feedstocks that contain at least 10 ppm nickel plus vanadium comprising:

a porous shaped catalyst particle comprising an elongated extrudate having an asymmetric quadralobe cross-section characterized by having the centers of the four component circles define two substantially equilateral triangles joined on a base, having substantially all of the points within said particle within 0.02 inch from the nearest external surface of said particle, said particle having an average pore diameter within the range of 120 Angstroms to 700 Angstroms, said particle having between 4 and 15 weight percent of a catalytic metal from Group VIB and between 0 and 10 weight percent of a catalytic metal from Group VIII; where said weight percents are based on the catalytic metals content of the total particle weight, calculated as reduced metal, such that when contacted with a heavy hydrocarbonaceous feedstock containing at least 10 ppm nickel plus vanadium under hydroprocessing conditions substantial metal penetration occurs to a depth of at least 0.012 inch from the nearest surface of said support.

2. The catalyst of claim 1 wherein substantially all regions of said particles are within 0.016 inch of the nearest surface.

3. The catalyst of claim 1 wherein substantial metals penetration occurs to a depth of at least 0.015 inch from the nearest surface.

4. The catalyst of claim 1 having an average pore diameter of between about 120 Angstroms and 200 Angstroms.

* * * * *